US012682878B2

(12) United States Patent
Tan et al.

(10) Patent No.: US 12,682,878 B2

(45) Date of Patent: Jul. 14, 2026

(54) SYSTEM AND METHOD FOR ACTIVE ACOUSTIC CONTROL

(71) Applicant: BAE SYSTEMS PLC, London (GB)

(72) Inventors: Joe Alexander Tan, Southampton Hampshire (GB); Jordan Cheer, Southampton Hampshire (GB); Stephen Daley, Southampton Hampshire (GB)

(73) Assignee: BAE SYSTEMS PLC, London (GB)

( * ) Notice: Subject to any disclaimer, the term of this patent is extended or adjusted under 35 U.S.C. 154(b) by 176 days.

(21) Appl. No.: 18/711,244

(22) PCT Filed: Nov. 9, 2022

(86) PCT No.: PCT/GB2022/052830

§ 371 (c)(1),
(2) Date: May 17, 2024

(87) PCT Pub. No.: WO2023/089300

PCT Pub. Date: May 25, 2023

(65) Prior Publication Data

US 2025/0022452 A1 Jan. 16, 2025

(30) Foreign Application Priority Data

Nov. 18, 2021 (EP) .................................... 21275163
Nov. 18, 2021 (GB) ..................................... 2116638

(51) Int. Cl.
*G10K 11/178* (2006.01)

(52) U.S. Cl.
CPC .. *G10K 11/17815* (2018.01); *G10K 11/17881* (2018.01); *G10K 2210/128* (2013.01);
(Continued)

(58) Field of Classification Search
CPC . G10K 11/17815; G10K 11/16; G10K 11/172
See application file for complete search history.

(56) References Cited

U.S. PATENT DOCUMENTS 4,025,724 A 5/1977 Davidson, Jr. et al.
4,044,203 A 8/1977 Swinbanks
(Continued)

FOREIGN PATENT DOCUMENTS

CN 108597491 A 9/2018
GB 2303993 A 3/1997
(Continued)

OTHER PUBLICATIONS

International Search Report and Written Opinion received for PCT/GB2022/052830. Mailed: Jan. 20, 2023. 13 pages.
(Continued)

*Primary Examiner* — Rasha S Al Aubaidi

(74) *Attorney, Agent, or Firm* — Arcane Law PLLC

(57) ABSTRACT

According to the present disclosure there is provided an active acoustic control system for controlling an acoustic signal propagating along a propagation path, the system comprising: an active control unit configured to: receive information from a first sensor arrangement, the information related to the acoustic signal propagating along the propagation path; generate a control signal for controlling the acoustic signal based on the information from the first sensor arrangement, by being arranged to control: a first control source arrangement comprising a finite 2D array of first control sources for generating a first control signal for controlling a first component of the acoustic signal.

14 Claims, 10 Drawing Sheets

(52) U.S. Cl.
CPC ................ *G10K 2210/3026* (2013.01); *G10K 2210/3027* (2013.01); *G10K 2210/3215* (2013.01)

(56) References Cited

U.S. PATENT DOCUMENTS

| | | | | |
|---|---|---|---|---|
| 4,122,303 | A | 10/1978 | Chaplin et al. | |
| 4,669,122 | A | 5/1987 | Swinbanks | |
| 5,347,586 | A | 9/1994 | Hill et al. | |
| 5,415,522 | A | 5/1995 | Pla et al. | |
| 6,160,892 | A | 12/2000 | Ver | |
| 6,959,092 | B1 | 10/2005 | Berkhoff et al. | |
| 2003/0219132 | A1 | 11/2003 | Sommerfeldt et al. | |
| 2009/0301805 | A1 | 12/2009 | Kakuhari | |
| 2018/0202612 | A1* | 7/2018 | Simpson | G01B 13/06 |
| 2018/0204561 | A1 | 7/2018 | Goto et al. | |
| 2018/0233123 | A1 | 8/2018 | Jin et al. | |
| 2025/0022453 | A1 | 1/2025 | Cheer et al. | |

FOREIGN PATENT DOCUMENTS

| | | | |
|---|---|---|---|
| JP | H05265469 | A | 10/1993 |
| JP | H06149271 | A | 5/1994 |
| JP | H10240267 | A | 9/1998 |
| WO | 2023089300 | A1 | 5/2023 |
| WO | 2023089301 | A1 | 5/2023 |

OTHER PUBLICATIONS

GB Search Report under Section 17(5) received for GB Application No. 2116638.4. Dated: Mar. 18, 2022. 4 pages.

Extended European Search Report received for EP Application No. 21275163.0. Dated: May 10, 2022. 12 pages.

International Search Report and Written Opinion received for PCT/GB2022/052835. Mailed: Jan. 20, 2023. 13 pages.

GB Search Report under Section 17(5) received for GB Application No. 2116636.8. Dated: Mar. 21, 2022. 3 pages.

Extended European Search Report received for EP Application No. 21275162.2. Dated: Apr. 29, 2022. 15 pages.

Elliott S.J., "Adaptive Control of Sound in a Duct Using an Array of Secondary Loudspeakers," Retrieved from the Internet on Jun. 8, 2023 from IEEE Xplore. 4 pages.

Winkler, J. and Elliott, S.J., "Adaptive Control of Broadband Sound in Ducts Using a Pair of Loudspeakers," Acustica, vol. 81, No. 5, (Sep. 1, 1995). pp. 475-488.

* cited by examiner

SYSTEM AND METHOD FOR ACTIVE ACOUSTIC CONTROL

FIELD

The present invention relates to an active acoustic control system and method.

BACKGROUND

In many situations it is desirable to control the propagation of acoustic signals (waves). Passive and active acoustic control techniques have been developed for this purpose.

Control of acoustic signals can be difficult and impractical using traditional passive noise control techniques, especially in, for example, the automotive and aerospace industries where there are weight and dimensional restrictions. Active noise control techniques have been developed to provide high levels of noise control without breaching weight and dimensional constraints.

Active noise control techniques can be employed in the field of "absorption control". In absorption control, it is desirable to reduce or minimise unwanted noise or disturbance caused by, for example, operating machinery. However, known active noise control techniques do not adequately achieve this. Moreover, known techniques are computationally demanding.

Active noise control techniques can also be employed in the field of "non-reciprocal acoustics". Reciprocity is an acoustic property that describes the symmetry of sound transmission between two points. For example, the sound transmission between an acoustic source and a receiver is equal to the sound transmission when the acoustic source and receiver are interchanged. However, reciprocity is not desirable in certain applications, such as full duplex communication, and thus this has led to significant interest in developing techniques to achieve one-way acoustic wave propagation. Known techniques achieve non-reciprocal acoustic transmission by introducing non-linearities, or by employing fluid motion or resonant cavities. However, known techniques can only achieve non-reciprocal behaviour over a narrow frequency range. Moreover, known techniques introduce signal distortions which can be difficult to control or increase complexity. Additionally, known techniques are not fully adaptable because the directivity of the nonreciprocal behaviour is fixed due to the use of gain and loss media.

It is an object of the present invention to provide an improved system and/or method thereof and/or address one or more of the problems discussed above, or discussed elsewhere, or to at least provide an alternative system and/or method.

SUMMARY

The summary statements which follow relate to a number of aspects. The aspects are only aspects of the invention where the system and method is as defined in the claims that follow. The reader will appreciate that features of the aspects which do not fall within the scope of the invention may nevertheless be incorporated in aspects of the invention which do fall within the scope of the invention.

According to a first aspect, there is provided an active acoustic control system for controlling an acoustic signal propagating along a propagation path, the system comprising: an active control unit configured to: receive information from a first sensor arrangement, the information related to the acoustic signal propagating along the propagation path; generate a control signal for controlling the acoustic signal based on the information from the first sensor arrangement, by being arranged to independently control: a first control source arrangement for generating a first control signal to control a first component of the acoustic signal; and a second control source arrangement for generating a second control signal to control a second component of the acoustic signal.

In one example, the active control unit comprises a first controller arranged to control the first control source arrangement and a second controller arranged to control the second control source arrangement.

In one example, the first component of the acoustic signal is a transmitted component. In one example, the second component of the acoustic signal is a reflected component. In one example, the first component of the acoustic signal is a transmitted component, and the second component of the acoustic signal is a reflected component.

In one example, the first control source arrangement faces downstream relative to the propagation path and the second control source arrangement faces upstream relative to the propagation path.

In one example, the active control unit comprises the first control source arrangement and the second control source arrangement.

In one example, the first sensor arrangement comprises pressure sensors and/or accelerometers.

In one example, the active control unit is configured to receive information from a second sensor arrangement for sensing an error signal.

In one example, wherein the second sensor arrangement is provided downstream of the active control unit along the propagation path.

In one example, the second sensor arrangement comprises pressure sensors and/or accelerometers.

In one example, the first control signal is used to control the first component thereby to minimise the first component of the acoustic signal.

In one example, the second control signal is used to control the second component thereby to minimise the second component of the acoustic signal.

In one example, the system further comprises an acoustic guide defining the propagation path.

In one example, the first control source arrangement and second control source arrangement are arranged in a one-dimensional manner along the propagation path.

In one example, the first control source arrangement comprises a 2D array of first control sources and/or the second control source arrangement comprises a 2D array of second control sources.

In one example, the first control source arrangement and/or second control source arrangement comprise pressure wave generators.

In one example, the first control source arrangement and second control source arrangement comprise loudspeakers and/or actuators.

According to a second aspect, there is provided a vehicle comprising an active acoustic control system according to the first aspect. In one example, the vehicle is a land-based vehicle, an aircraft, or a sub-surface vehicle.

According to a third aspect, there is provided a vehicle component comprising an active acoustic control system according to the first aspect. In one example, the vehicle component is a panel.

According to a fourth aspect, there is provided a method of controlling an acoustic signal propagating along a propagation path comprising: receiving information related to the acoustic signal propagating along the propagation path from a first sensor arrangement; generating a control signal for controlling the acoustic signal based on the received information by independently controlling: a first control source arrangement for generating a first control signal for controlling a first component of the acoustic signal; and a second control source arrangement for generating a second control signal for controlling a second component of the acoustic signal.

According to a fifth aspect, there is provided an active acoustic control system for controlling an acoustic signal propagating along a propagation path, the system comprising: an active control unit configured to: receive information from a first sensor arrangement, the information related to the acoustic signal propagating along the propagation path; generate a control signal for controlling the acoustic signal based on the information from the first sensor arrangement, by being arranged to control: a first control source arrangement comprising a finite 2D array of first control sources for generating a first control signal for controlling a first component of the acoustic signal.

In one example, the first component is a transmitted component of the acoustic signal.

In one example, the first control signal is used to control the first component of the acoustic signal thereby to minimise the first component of the acoustic signal.

In one example, the first control source arrangement comprises a 2D array of monopole control sources.

In one example, the active control unit is configured to: receive information from a second sensor arrangement, the information related to the acoustic signal propagating along the propagation path; generate a control signal for controlling the acoustic signal based on the information from the second sensor arrangement, by being arranged to control: a second control source arrangement comprising a finite 2D array of second control sources for generating a second control signal for controlling a second component of the acoustic signal.

In one example, the second component is a reflected component of the acoustic signal.

In one example, the first control signal is used to control the first component thereby to minimise the first component of the acoustic signal and the second control signal is used to control the second component thereby to minimise the second component of the acoustic signal.

In one example, the first control source arrangement and second control source arrangement are correspondingly arranged to provide pairs of control sources comprising one control source from the first control source arrangement and one control source from the second control source arrangement.

In one example, the active control unit comprises a first controller arranged to control the first control source arrangement and a second controller arranged to control the second control source arrangement.

In one example, the first control source arrangement and/or second control source arrangement comprise pressure wave generators.

In one example, the first control source arrangement or first control source arrangement and second control source arrangement comprise loudspeakers and/or actuators.

In one example, the first sensor arrangement or first sensor arrangement and second sensor arrangement comprises pressure sensors and/or accelerometers.

In one example, the system further comprises an acoustic guide defining the propagation path.

According to a sixth aspect, there is provided a vehicle comprising an active acoustic control system according to the fifth aspect. In one example, the vehicle is a land-based vehicle, an aircraft, or a sub-surface vehicle.

According to a seventh aspect, there is provided a vehicle component comprising an active acoustic control system according to the fifth aspect. In one example, the vehicle component is a panel.

According to an eighth aspect, there is provided a method of controlling an acoustic signal propagating along a propagation path comprising: receiving information related to the acoustic signal propagating along the propagation path from a first sensor arrangement; generating a control signal for controlling the acoustic signal based on the received information by controlling: a first control source arrangement comprising a finite 2D array of first control sources for generating a first control signal for controlling a first component of the acoustic signal.

In one example, the method further comprises: receiving information related to the acoustic signal propagating along the propagation path from a second sensor arrangement; generating a control signal for controlling the acoustic signal based on the received information by controlling: a second control source arrangement comprising a finite 2D array of second control sources for generating a second control signal for controlling a second component of the acoustic signal.

It will of course be appreciated that features described in relation to one aspect of the present invention may be incorporated into other aspects of the present invention. For example, the method of any aspect of the invention may incorporate any of the features described with reference to the apparatus of any aspect of the invention and vice versa.

Other preferred and advantageous features of the invention will be apparent from the following description.

BRIEF DESCRIPTION OF THE FIGURES

Embodiments of the invention will now be described by way of example only with reference to the figures, in which.

DETAILED DESCRIPTION

The description which follows describes a number of embodiments. The embodiments are only embodiments of the invention where the system and method is as defined in the claims that follow. The reader will appreciate that features of the embodiments which do not fall within the scope of the invention may nevertheless be incorporated in embodiments of the invention which do fall within the scope of the invention.

It is an aim of embodiments described herein to provide an active acoustic control system to control acoustic absorption in an environment. In particular, it is an aim to maximise acoustic absorption, such that a residual acoustic component is minimised. Such an active acoustic control system may be said to be for controlling an acoustic signal propagating along a propagation path. Such a system may also be referred to as an "active acoustic absorption control system".

It is also an aim of embodiments described herein to provide an active acoustic control system to exhibit non-reciprocal behaviour in an environment. In particular, it is an aim to allow acoustic transmission in a first direction, whilst preventing, or minimising, acoustic transmission in a second, opposite, direction. Such an active acoustic control system may be said to be for controlling an acoustic signal propagating along a propagation path. Such a system may also be referred to as a "non-reciprocal active acoustic control system", or simply a "non-reciprocal acoustic system".

In the description which follows, active control units are employed in active control of acoustic signals. In implementing the invention, the active acoustic control system may comprise certain components, such as sensor arrangements and control source arrangements. Alternatively, the invention may also be implemented by configuring an active control unit to interact with such components. That is, an existing system may be provided with an active control unit, in a retrofit manner. In this case, the active control unit may, for example, receive information from sensor arrangement and/or generate control signals (which can be acoustic control signals (e.g., acoustic waves) or mechanical control signals (e.g., mechanical waves)) or by controlling control source arrangements, without such sensor arrangements or control source arrangements forming part of the system itself. In some examples, the control signals may be longitudinal waves, or "pressure waves". In this vein, control source arrangements may be, or comprise, pressure wave generators. For the purpose of description, systems are described as comprising such components in addition to an active control unit. Nevertheless, it will be understood that the system need not comprise said components, and the active control unit may be retrofitted in an existing system or apparatus already comprising said components.

Figure 1:
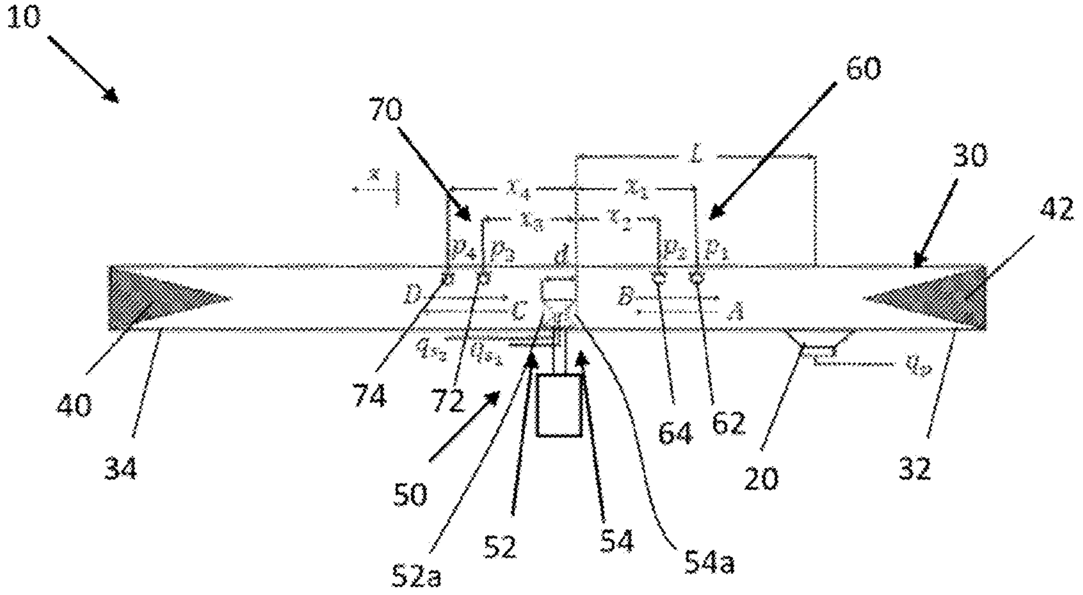
FIG. 1 shows an active acoustic control system.

Referring to FIG. 1, a general active acoustic control system 10 is shown. The general system 10 may provide useful information for understanding the active acoustic control systems according to embodiments described herein.

A primary disturbance source 20 is attached to a duct 30 toward a first end 32. The primary disturbance source 20 generates an acoustic pressure $P_P(x)$ at position x in the duct 30. The primary disturbance source 20 is operable to generate an acoustic signal which propagates along a propagation path through the duct 30. "Upstream" in the duct 30 is therefore defined as upstream relative to the direction in which an acoustic signal generated by the primary source 20 propagates. This may be referred to as "upstream in the propagation path". "Downstream" in the duct 30 is therefore defined as downstream relative to the direction in which an acoustic signal generated by the primary source 20 propagates. This may be referred to as "downstream in the propagation path". An anechoic termination 40, 42 is provided at both ends 32, 34 of the duct 30.

An active control unit 50 is located at the centre of the duct 30 between the ends 32, 34. The active control unit 50 is provided at a distance L away from the primary source 20. A first sensor arrangement 60 is located upstream in the duct 30 and a second sensor arrangement 70 is located downstream in the duct 30. That is, the first sensor arrangement 60 is located closer to the primary source 20 than the second sensor arrangement 70. The first sensor arrangement 60 comprises two acoustic pressure sensors 62, 64. The second sensor arrangement 70 comprises two acoustic pressure sensors 72, 74. Herein, for brevity, an "acoustic pressure sensor" will be referred to as a "pressure sensor".

The active control unit 50 is configured to generate a control signal (or "control sound field"). The active control unit 50 generates an additional acoustic pressure $P_S(x)$ at position x in the duct 30. By generating the control signal in the duct 30, the primary sound field generated by the primary disturbance source 20 can be controlled.

The active control unit 50 comprises a first control source arrangement 52 and a second control source arrangement 54. In this example, the first and second control source arrangement 52, 54 each comprise a monopole control source 52*a*, 54*a*. The first control 52*a* is located at x=0 and the second control source 54*a* is located at x=d. Their source strengths are individually controllable.

In absorption control, the aim is to maximise the absorption, which can be achieved by minimising the downstream pressure, whilst produce zero upstream sound radiation due to the control sources 52*a*, 54*a*.

The first control source arrangement 52 is for generating a first control signal to control a first component of the acoustic signal. The second control source arrangement 54 is for generating a second control signal to control a second component of the acoustic signal. The control signals may be longitudinal waves, or pressure waves, which encompass acoustic waves. Here, the first component of the acoustic signal is a transmitted component, and the second component of the acoustic signal is a reflected component. The active acoustic control system 10 is configured to control the transmitted component and reflected component individually. By minimising the transmitted and reflected components, absorption is maximised accordingly.

In the embodiments which follow, the first component of the acoustic signal and the second component of the acoustic signal may be the same component. That is, the first control source arrangement and second control source arrangement may be arranged to control the same component, for example the transmitted component or the reflected component. Alternatively, and primarily, the first component and second component are different components. That is, the first component of the acoustic signal may be one of the transmitted component and the reflected component, and the second component of the acoustic signal may be the other of the transmitted component and the reflected component. That is, the first control source arrangement and second control source arrangement are for controlling different components of the acoustic signal.

Figure 2:
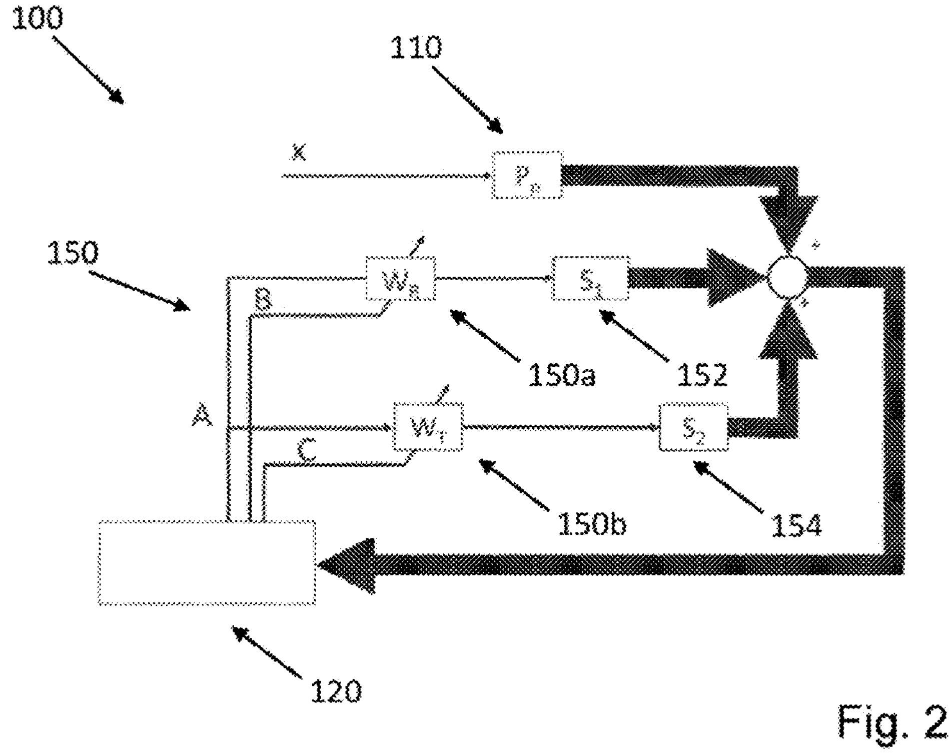
FIG. 2 shows a block diagram of an active acoustic control system.

Referring to FIG. 2, a feedforward control block diagram of an active acoustic control system 100 is shown. Specifically, FIG. 2 illustrates a "decentralised" control system, as will be described in further detail herein. The primary source path is indicated at $P_P$/110. An active control unit 150 comprises a first controller $W_R$/150*a*. The first controller 150*a* is a reflected wave controller, configured to drive a first control source arrangement $S_1$/152 to minimise the reflected component B. A second controller $W_T$/150*b* is a transmitted wave controller configured to drive second control source arrangement $S_2$/154 to minimise the transmitted component C. Positive incident wave A is used as the reference signal.

In order to control the transmitted and reflected components, the components are separated from the total acoustic pressure using a wave separation method. Many wave separation methods are known and well documented in the literature, including the "integration method", the "equivalent source method" and the "delay method". In FIG. 2, the wave separation algorithm used by the controllers 150*a*, 150*b* is indicated generally at 120.

The active control unit 150 is configured to independently control the first control source arrangement 152 and the second control source arrangement 154. This may be referred to as "decentralised" control, or as "decentralised absorption control". Each of the first controller 150*a* and second controller 150*b* employs a single channel Filtered Least Mean Squared (FxLMS) adaptive algorithm. The first controller 150*a* drives the first control source arrangement 152, which comprises an upstream facing first control source 152*a*, to minimise the reflected component. The second controller 150*b* drives the second control source arrangement 154, which comprises a downstream facing second control source 154*a*, to minimise the transmitted component. In this way, absorption of a primary disturbance signal in the primary source path 110 is maximised.

Figure 3:
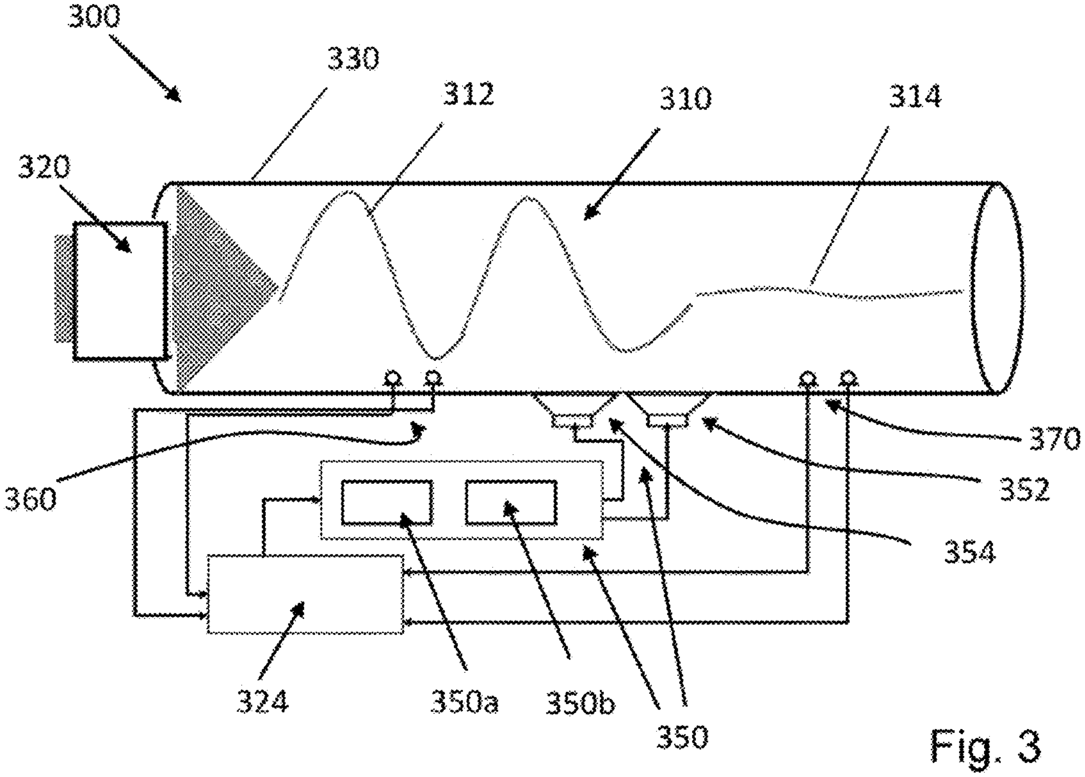
FIG. 3 shows an active acoustic control system according to a first embodiment.

Referring to FIG. 3, an active acoustic control system 300 according to a first embodiment is shown.

The active acoustic control system 300 is for controlling an acoustic signal propagating along a propagation path. In particular, the system 300 is for actively absorbing the acoustic signal. In FIG. 3, the acoustic signal propagating along the propagation path is indicated at 310. The acoustic signal 310 comprises an uncontrolled portion 312 and a controlled portion 314. As shown in the figure, the controlled portion 314 has a reduced amplitude compared with the uncontrolled portion 312. This is by virtue of the active acoustic control system 300 being operated to absorb the acoustic signal.

The system 300 comprises an active control unit 350, a first sensor arrangement 360, a first control source arrangement 352 and a second control source arrangement 354. The first control source arrangement 352 is operable to generate a first control signal to control a first component of the acoustic signal 310. The second control source arrangement 354 is operable to generate a second control signal to control a second component of the acoustic signal 310. In this example the first control signal and second control signal are acoustic control signals/waves.

The first sensor arrangement 360 comprises pressure sensors. In this way, acoustic pressure may be sensed or detected, enabling control of acoustic signals.

The first control source arrangement 352 and second control source arrangement 354 comprise loudspeakers. In this way, acoustic signals propagating along the propagation path may be controlled by the provision of acoustic signals by the first control source arrangement 352 and second control source arrangement 354.

As above, the active control unit 350 may be retrofitted in a system or apparatus comprising the first sensor arrangement 360 and control source arrangements 352, 354.

The active control unit 350 is configured to receive information from the first sensor arrangement 360. The information provided by the first sensor arrangement 360 relates to the acoustic signal 310 propagating along the propagation path. The active control unit 350 is further configured to generate a control signal for controlling the acoustic signal 310 based on the information from the first sensor arrangement 360.

The active control unit 350 is arranged to control the first control source arrangement 352 and second control source arrangement 354. Notably, the active control unit 350 is arranged to independently control the first control source arrangement 352 and second control source arrangement 354. This may be referred to as "decentralised" control. The active control unit 350 is arranged to adaptively calculate the optimal voltage for controlling the first control source arrangement 352 and second control source arrangement 254 to maximise sound absorption.

By independently controlling the first control source arrangement 352 and second control source arrangement 354, a computational load advantage is realised. This is because it is only necessary to determine sets of filter coefficients for two filters for use in generating the control signals, one for each of the control source arrangements 352, 354.

The active control unit 350 can comprise a first controller 350*a* arranged to control the first control source arrangement 352 and a second controller 350*b* arranged to control the second control source arrangement 354. Advantageously, by providing separate controllers, computational complexity may be reduced as each controller is provided for a single operation or purpose. This may facilitate independent control. In FIG. 3, the wave separation algorithm used by the controllers 350*a*, 350*b*, or by active control unit 350 generally, is indicated generally at 324.

The system 300 further comprises an acoustic guide 330 in the form of a duct. The acoustic guide 330 provides, or defines, the propagation path for the acoustic signal. In this way, the acoustic guide 330 can isolate, or shield, the acoustic signal from outside disturbance, improving the ability of the system 300 to minimise an acoustic signal within the acoustic guide 330.

A primary disturbance source 320 is arranged at a first end of the acoustic guide 330. The primary disturbance source 320 may be, for example, a heating, ventilation and air-conditioning (HVAC) unit. It is desirable to minimise acoustic signals (e.g., unwanted noise) generated by the HVAC unit.

The first component of the acoustic signal 310 is a transmitted component of the acoustic signal 310. The second component of the acoustic signal is a reflected component of the acoustic signal 310. In this way, the first control source arrangement 352 is operable to generate a first control signal, which is a control signal for controlling the transmitted component. Accordingly, the second control source arrangement 354 is operable to generate a second control signal, which is a control signal for controlling the reflected component. By controlling the transmitted and reflected components, absorption is controlled accordingly. Advantageously, by independently driving the first and second control source arrangements to minimise the transmitted and reflected components respectively (by provision of appropriate control signals), absorption of the acoustic signal 310 is maximised. By doing so, only a residual noise component, indicated by controlled portion 314 of the acoustic signal 310, may remain. The residual noise component 314 may have zero amplitude.

The active control unit 350 is configured to receive information from a second sensor arrangement 370. The second sensor arrangement 370 is for sensing an error signal. By providing the second sensor arrangement 370, an adaptive system 300 is provided which is able to adapt operation based on the acoustic signal provided by the primary source 300. Advantageously, this facilitates broadband adaptive absorption control of acoustic signals.

The second sensor arrangement 370 is provided downstream of active control unit 350 along the propagation path. That is, the second sensor arrangement 370 is capable of sensing the acoustic signal after the active control unit 350 has controlled the acoustic signal, thereby to determine a residual noise component. In this way, the second sensor arrangement 370 can provide information to the active control unit 350 to inform further control of the acoustic signal. That is, the active control unit 350 may determine, based on the information (or feedback from the second sensor arrangement 370) that the control signals need to be adapted, changed or maintained, to control the acoustic signal. That is, the first sensor arrangement 360 may be referred to as a "reference sensor arrangement" and the second sensor arrangement 370 may be referred to as an "error sensor arrangement".

The second sensor arrangement 370 comprises pressure sensors. In this way, acoustic pressure may be sensed or detected, enabling control of acoustic signals.

As shown in FIG. 3, the first control source arrangement 352 and second control source arrangement 354 are arranged in a one-dimensional manner along the propagation path. The first control source arrangement 352 and second control source arrangement 354 are linearly arranged along the propagation path. Such an arrangement may simplify signal processing, reducing computational load, and simplify determination of appropriate control signals.

Figure 4:
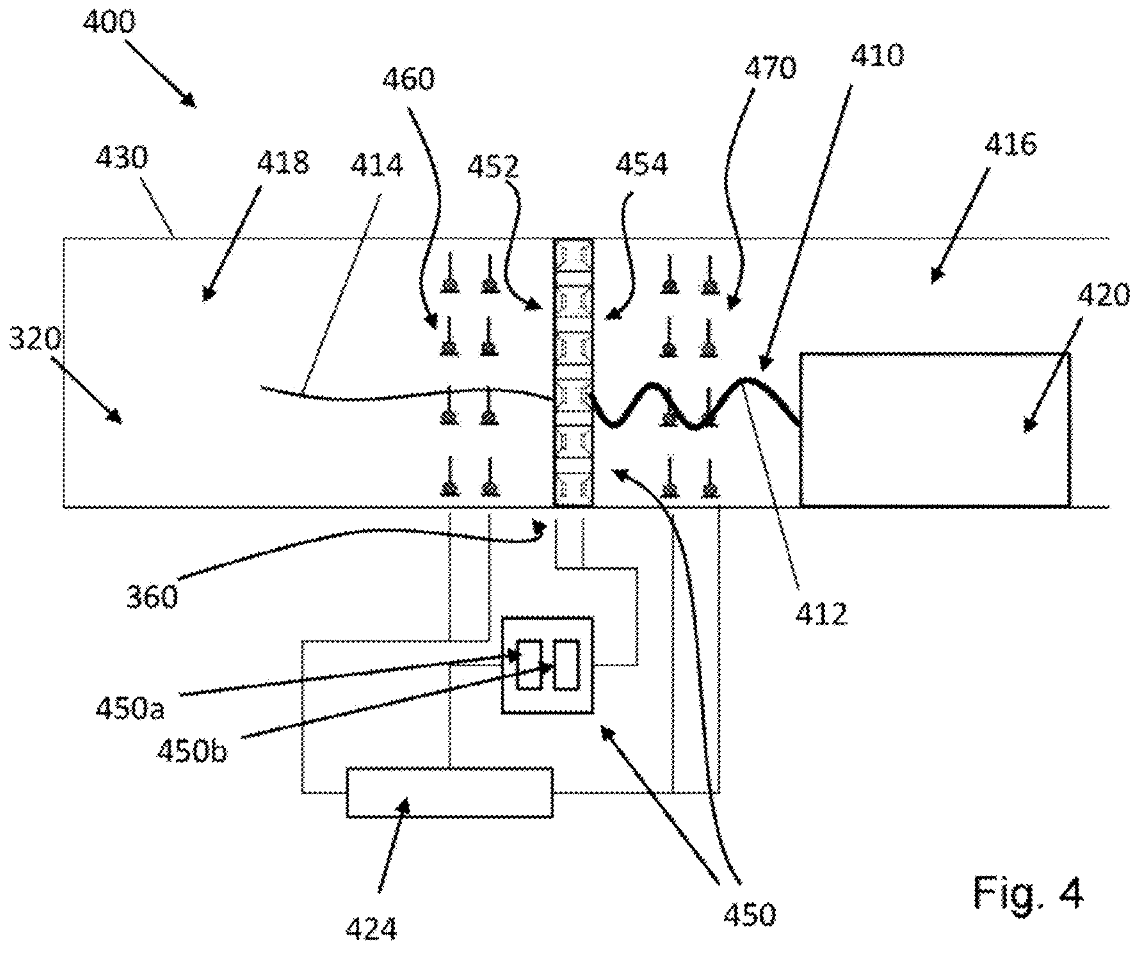
FIG. 4 shows an active acoustic control system according to a second embodiment.

Referring to FIG. 4, an active acoustic control system 400 according to a second embodiment is shown.

The active acoustic control system 400 is for controlling an acoustic signal propagating along a propagation path. In particular, the system 400 is for actively absorbing the acoustic signal. In FIG. 4, the acoustic signal propagating along the propagation path is indicated at 410. The acoustic signal 410 comprises an uncontrolled portion 412 and a controlled portion 414. As shown in the figure, the controlled portion 414 has a reduced amplitude compared with the uncontrolled portion 412. This is by virtue of the active acoustic control system 400 being operated to absorb the acoustic signal.

The acoustic signal 410 is generated in a first zone 416. The acoustic signal 410 is generated by, for example, an engine in the first zone 416. That is, the engine may be a primary disturbance source 420. The acoustic signal 410 is controlled such that only residual noise, or no noise, is present in a second zone 418. The second zone 418 may be, for example, living quarters. The system 400 is provided between the first zone 416 and second zone 418, for example at a wall or interface between the first zone 416 and second zone 418.

The active acoustic control system 400 according to the second embodiment comprises substantially the same components as the active acoustic control system 300 according to the first embodiment. Furthermore, the active acoustic control system 400 according to the second embodiment is configured to operate in substantially the same way as the active acoustic control system 300 according to the first embodiment, to maximise sound absorption.

The system 400 comprises an active control unit 450, a first sensor arrangement 460, a first control source arrangement 452 and a second control source arrangement 454. The first control source arrangement 452 is operable to generate a first control signal to control a first component of the acoustic signal 410. The second control source arrangement 454 is operable to generate a second control signal to control a second component of the acoustic signal 410. In this example the first control signal and second control signal are acoustic control signals/waves.

The first control source arrangement 452 and second control source arrangement 454 comprise loudspeakers. In this way, acoustic signals propagating along the propagation path may be controlled by the provision of acoustic signals by the first control source arrangement 452 and second control source arrangement 454.

Notably, the first control source arrangement 452 comprises a 2D array of control sources. That is, a number of control sources that extend across a two-dimensional plane. The second control source arrangement 454 comprises a 2D array of control sources. Together, the first control source arrangement 452 and second control source arrangement 454 define a dual layer array of control sources. Advantageously, in this way, acoustic absorption control is maximised in a two- or three-dimensional space.

The first control source arrangement 452 and second control source arrangement 454 are provided downstream of the first sensor arrangement 460. In this way, information provided by the first sensor arrangement 460 is indicative of the acoustic signal prior to control by the system 400, which simplifies processing and calculation of appropriate control signals.

The first control source arrangement 452 faces downstream relative to the propagation path. The second control source arrangement 454 faces upstream relative to the propagation path. In this way, control of the transmitted component and reflected component of the acoustic signal is targeted and thereby improved.

The first sensor arrangement 460 comprises pressure sensors. In this way, acoustic pressure may be sensed or detected, enabling control of acoustic signals. In particular, the first sensor arrangement 460 comprises a dual layer array of sensors.

The active control unit 450 is arranged to control the first control source arrangement 452 and second control source arrangement 454. Notably, the active control unit 450 is arranged to independently control the first control source arrangement 452 and second control source arrangement 454. This may be referred to as "decentralised" control. The active control unit 450 is arranged to adaptively calculate the optimal voltage for controlling the first control source arrangement 452 and second control source arrangement 454 to maximise sound absorption.

By independently controlling the first control source arrangement 452 and second control source arrangement 454, a computational load advantage is realised. This is because it is only necessary to determine sets of filter coefficients for two filters use in generating the control signals, one for each of the control source arrangements 452, 454.

The active control unit 450 can comprise a first controller 450*a* arranged to control the first control source arrangement 452 and a second controller 450*b* arranged to control the second control source arrangement 454. Advantageously, by providing separate controllers, computational complexity may be reduced as each controller is provided for a single operation or purpose. This may facilitate independent control. In FIG. 4, the wave separation algorithm used by the controllers 450*a*, 450*b*, or by active control unit 450 generally, is indicated generally at 424.

The second sensor arrangement 470 comprises pressure sensors. In this way, acoustic pressure may be sensed or detected, enabling control of acoustic signals. In particular, the second sensor arrangement 470 comprises a dual layer array of sensors.

As shown in FIG. 4, the first control source arrangement 452 and second control source arrangement 454 are arranged in a three-dimensional manner across the propagation path. The first control source arrangement 452 and second control source arrangement 454 are distributed across the propagation path. Such an arrangement may enable control of acoustic signals in two or three dimensions.

Figure 5:
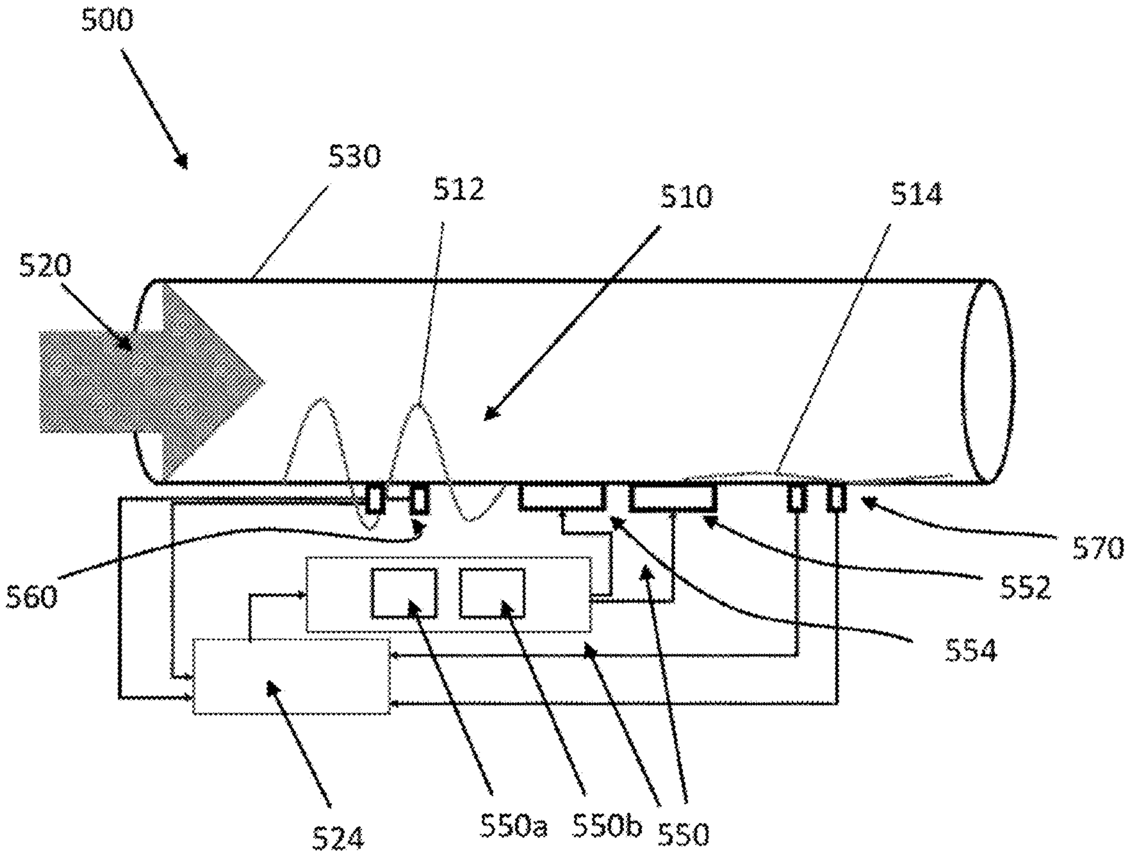
FIG. 5 shows an active acoustic control system according to a third embodiment.

Referring to FIG. 5, an active acoustic control system 500 according to a third embodiment is shown.

The active acoustic control system 500 is for controlling an acoustic signal propagating along a propagation path. In particular, the system 500 is for actively absorbing the acoustic signal. In FIG. 5, the acoustic signal propagating along the propagation path is indicated at 510. The acoustic signal 510 is an acoustic signal propagating by virtue of a vibrating structural component, for example a wall or other structural member. That is, the propagation path may be defined by the structural component. That is, vibrations may occur in the structural component, and it is desirable to control the acoustic signals by virtue of the vibration of the structural component. The acoustic signal 510 comprises an uncontrolled portion 512 and a controlled portion 514. As shown in the figure, the controlled portion 514 has a reduced amplitude compared with the uncontrolled portion 512. This is by virtue of the active acoustic control system 500 being operated to absorb the acoustic signal.

The active acoustic control system 500 according to the third embodiment comprises substantially the same components as the active acoustic control system 300 according to the first embodiment and the active acoustic control system 400 according to the second embodiment. Furthermore, the active acoustic control system 500 according to the second embodiment is configured to operate in substantially the same way as the system 300 according to the first embodiment and system 400 according to the second embodiment, to maximise sound absorption.

The system 500 comprises an active control unit 550, a first sensor arrangement 560, a first control source arrangement 552 and a second control source arrangement 554. The first control source arrangement 552 is operable to generate a first control signal to control a first component of the acoustic signal 510. The second control source arrangement 554 is operable to generate a second control signal to control a second component of the acoustic signal 510. In this example the first control signal and second control signal are acoustic control signals/waves.

The first control source arrangement 552 and second control source arrangement 554 comprise actuators. In this way, acoustic signals propagating along the propagation path may be controlled by the provision of vibrational input control signals by the first control source arrangement 552 and second control source arrangement 554.

The first sensor arrangement 560 comprises accelerometers. The accelerometers can sense, or detect, deformation of the structural members to which they are attached, connected or arranged to sense. In this way, acoustic pressure generated by the acoustic signal may be indirectly sensed, by reference to the deformation of the structural member.

The active control unit 550 is arranged to control the first control source arrangement 552 and second control source arrangement 554. Notably, the active control unit 550 is arranged to independently control the first control source arrangement 552 and second control source arrangement 554. This may be referred to as "decentralised" control. The active control unit 550 is arranged to adaptively calculate the optimal voltage for controlling the first control source arrangement 552 and second control source arrangement 554 to maximise sound absorption.

By independently controlling the first control source arrangement 552 and second control source arrangement 554, a computational load advantage is realised. This is because it is only necessary to determine sets of filter coefficients for two filters for use in generating the control signals, one for each of the control source arrangements 552, 554.

The active control unit 550 can comprise a first controller 550*a* arranged to control the first control source arrangement 552 and a second controller 550*b* arranged to control the second control source arrangement 554. Advantageously, by providing separate controllers, computational complexity may be reduced as each controller is provided for a single operation or purpose. This may facilitate independent control. In FIG. 5, the wave separation algorithm used by the controllers 550*a*, 550*b*, or by active control unit 550 generally, is indicated generally at 524.

A second sensor arrangement 570 comprises accelerometers. In this way, acoustic pressure may be indirectly sensed or detected, enabling control of acoustic signals. The accelerometers may sense or detect structural acceleration of a component to which they are connected or mounted.

Figure 6:
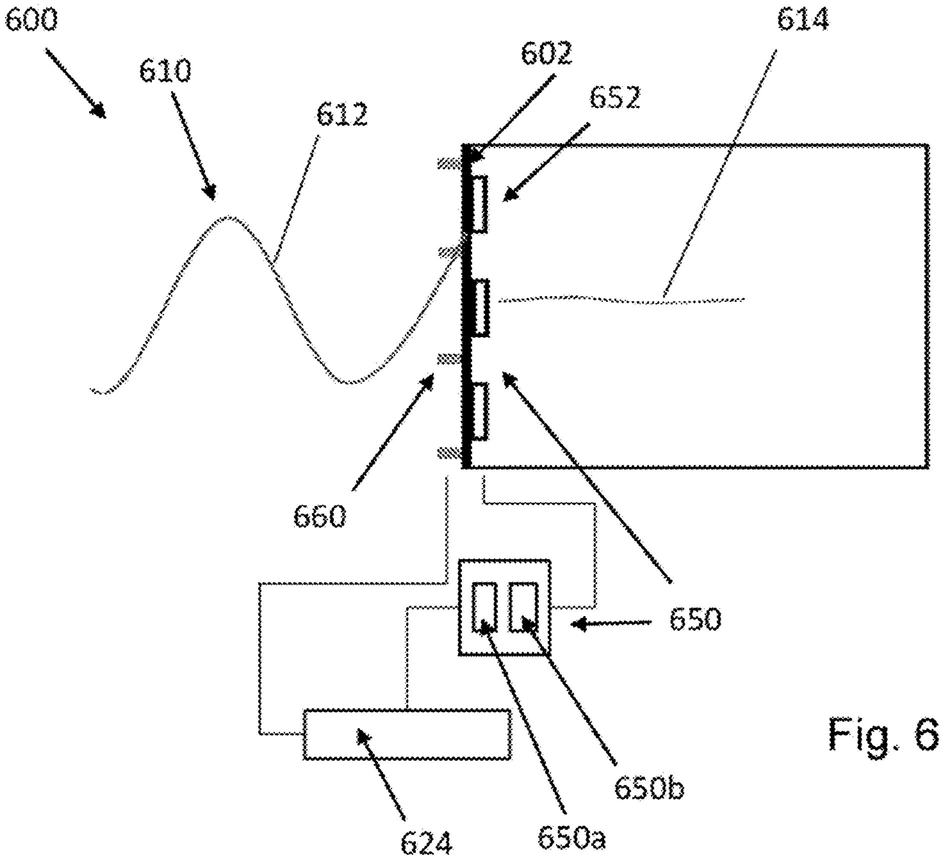
FIG. 6 shows an active acoustic control system according to a fourth embodiment.

Referring to FIG. 6, an active acoustic control system 600 according to a fourth embodiment is shown.

The active acoustic control system 600 is for controlling an acoustic signal propagating along a propagation path. The active acoustic control system 600 is for controlling an acoustic signal propagating along a propagation path. In particular, the system 600 is for actively absorbing the acoustic signal. In FIG. 6, the acoustic signal propagating along the propagation path is indicated at 610. The acoustic signal 610 is an acoustic signal propagating and incident on a structural component 602, thereby to cause the structural component to vibrate or deform. The acoustic signal 610 comprises an uncontrolled portion 612 and a controlled portion 614. As shown in the figure, the controlled portion 614 has a reduced amplitude compared with the uncontrolled portion 612. This is by virtue of the active acoustic control system 600 being operated to absorb the acoustic signal.

The active acoustic control system 600 according to the fourth embodiment comprises substantially the same components as the active acoustic control system 300 according to the first embodiment, the active acoustic control system 400 according to the second embodiment and the active acoustic control system 500 according to the third embodiment. Furthermore, the active acoustic control system 500 according to the fourth embodiment is configured to operate in substantially the same way as the system 300 according to the first embodiment, the system 400 according to the second embodiment and the system 500 according to the third embodiment, to maximise sound absorption.

The system 600 comprises an active control unit 650, a first sensor arrangement 660, a first control source arrangement 652 and a second control source arrangement (not shown). The first control source arrangement 652 is operable to generate a first control signal to control a first component of the acoustic signal 610. The second control source arrangement is operable to generate a second control signal to control a second component of the acoustic signal 610. In this example the first control signal and second control signal are acoustic control signals/waves.

The first control source arrangement 652 and second control source arrangement comprise actuators. In this way, acoustic signals propagating along the propagation path may be controlled by the provision of vibrational input control signals by the first control source arrangement 652 and second control source arrangement.

The first sensor arrangement 660 comprises accelerometers. The accelerometers can sense, or detect, deformation of the structural component 602 to which they are attached, connected or arranged to sense. In this way, acoustic pressure generated by the acoustic signal may be indirectly sensed, by reference to the deformation of the structural component 602.

The active control unit 650 is arranged to control the first control source arrangement 652 and second control source arrangement. Notably, the active control unit 650 is arranged to independently control the first control source arrangement 652 and second control source arrangement. This may be referred to as "decentralised" control. The active control unit 650 is arranged to adaptively calculate the optimal voltage for controlling the first control source arrangement 652 and second control source arrangement to maximise sound absorption.

By independently controlling the first control source arrangement 652 and second control source arrangement, a computational load advantage is realised. This is because it is only necessary to determine sets of filter coefficients for two filters for use in generating the control signals, one for each of the control source arrangements.

The active control unit 650 can comprise a first controller **650*a* arranged to control the first control source arrangement 652 and a second controller 650*b* arranged to control the second control source arrangement. Advantageously, by providing separate controllers, computational complexity may be reduced as each controller is provided for a single operation or purpose. This may facilitate independent control. In FIG. 6, the wave separation algorithm used by the controllers 650*a*, 650*b*, or by active control unit 650 generally, is indicated generally at 624**.

Figure 7:
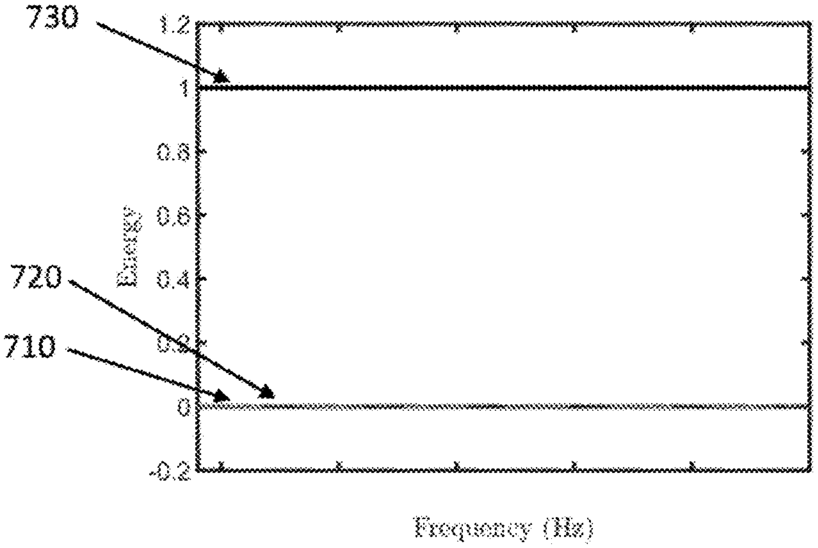
FIG. 7 shows a plot of performance in terms of transmission, reflection and absorption coefficients.

Referring to FIG. 7, a plot of frequency (x-axis) against energy (y-axis) is shown to indicate the performance metric of the systems 300, 400, 500. The transmission coefficient (indicative of the transmitted component) is indicated at 710. The reflection coefficient (indicative of the reflected component) is indicated at 720. The absorption coefficient (indicative of a theoretical absorbed component) is indicated at 730.

As will be understood from FIG. 7, the transmission and reflection coefficients indicate zero energy across a broadband frequency range. This illustrates that the transmitted and reflected components are minimised across a broadband frequency range. Accordingly, the absorption coefficient indicates perfect absorption of the acoustic signal across the same broadband frequency range.

Referring back to FIG. 1, in non-reciprocal acoustics, the aim is to allow acoustic transmission in a first direction, whilst preventing, or minimising, acoustic transmission in a second, opposite, direction. Similarly to absorption control, in non-reciprocal acoustics it is aimed to maximise the absorption, which can be achieved by minimising the downstream pressure, whilst produce zero upstream sound radiation due to the control sources **52*a*, 54*a***.

The first control source arrangement 52 is for generating a first control signal to control a first component of the acoustic signal. The second control source arrangement 54 is for generating a second control signal to control a second component of the acoustic signal. Here, the first component of the acoustic signal is a transmitted component, and the second component of the acoustic signal is a reflected component. The active acoustic control system 10 is configured to control the transmitted component and reflected component individually. By minimising the transmitted and reflected components, absorption is maximised accordingly.

Figure 8:
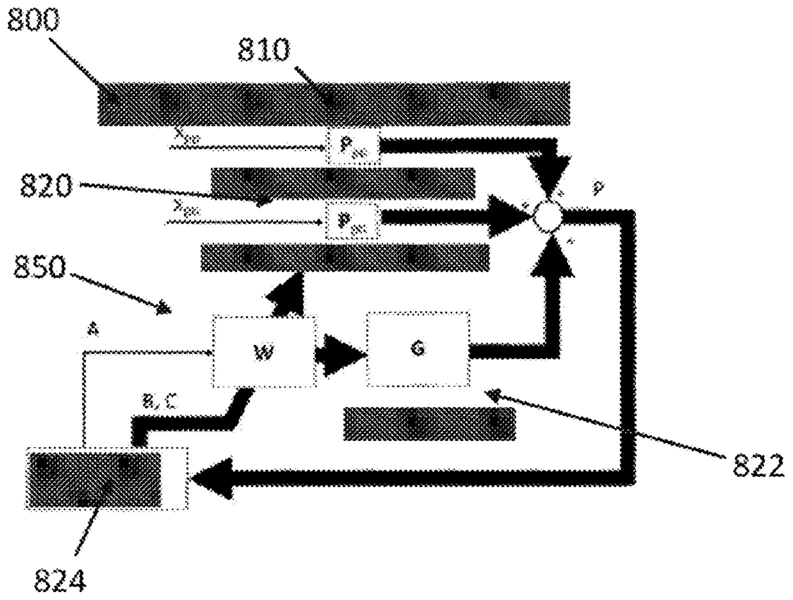
FIG. 8 shows a block diagram of an active acoustic control system.

Referring to FIG. 8, a feedforward control block diagram of an active acoustic control system 800 is shown. Specifically, FIG. 8 illustrates a "fully-coupled" control system. Nevertheless, the skilled person will appreciate that non-reciprocal control may instead incorporate a decentralised control strategy or system, as described above.

The positive primary source path is indicated at 810. The negative primary source path is indicated at 820. The active control unit is indicated at 850. The secondary path is indicated at 822. The active control unit 850 is configured to drive a first control source arrangement to minimise the reflected component B. The active control unit 850 is configured to drive a second control source arrangement to minimise the transmitted component C. Positive incident wave A is used as the reference signal. In FIG. 8, the wave separation algorithm used by the active control unit 850 is indicated generally at 824.

Figure 9:
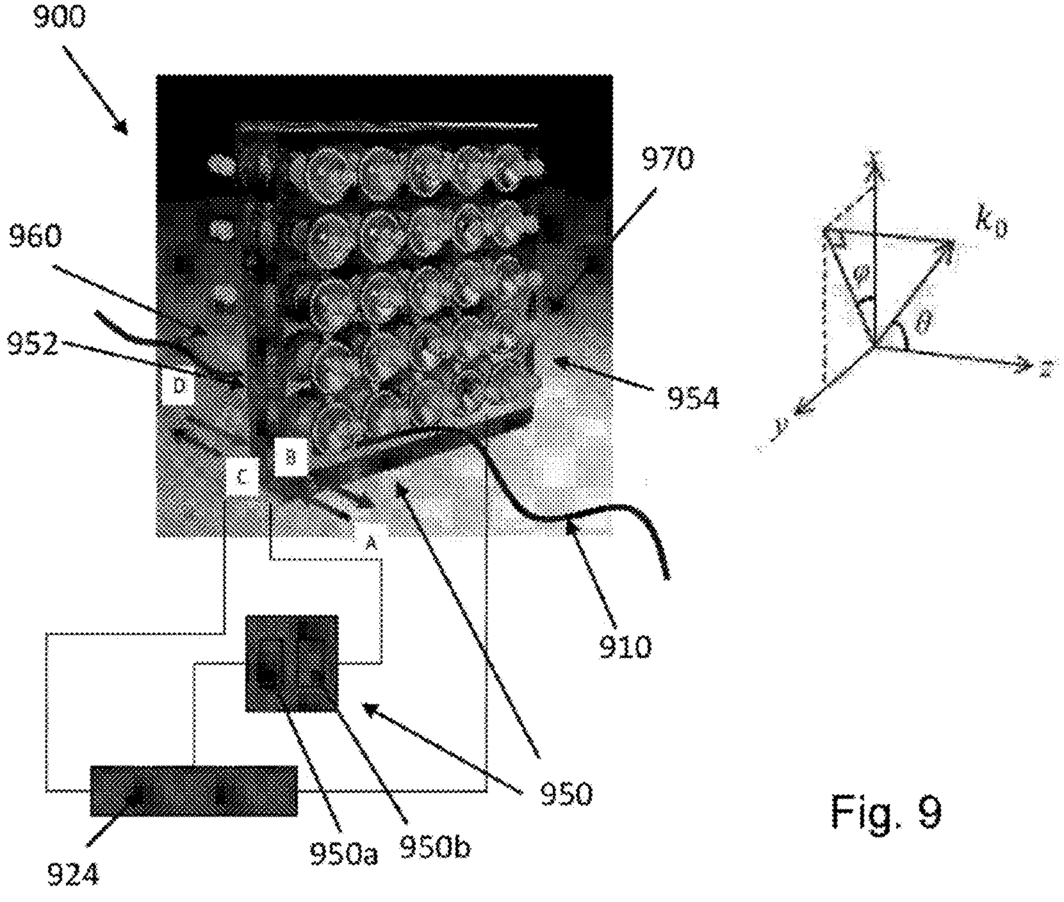
FIG. 9 shows an active acoustic control system according to a fifth embodiment.

Referring to FIG. 9, an active acoustic control system 900 according to a fifth embodiment is shown, alongside a coordinate system. The active acoustic control system 900 is for controlling an acoustic signal propagating along a propagation path. In particular, the system 900 is for non-reciprocal acoustic control. As shown in the figure, A is the positive incident wave component, B is the reflected wave component, C is the transmitted wave component and D is the negative incident wave component.

The active acoustic control system 900 is a non-reciprocal active acoustic control system. The system 900 comprises an active control unit 950, a first sensor arrangement 960 and a first control source arrangement 952. The first control source arrangement 952 is operable to generate a first control signal to control a first component of the acoustic signal. In this example the first control signal is an acoustic control signal/wave.

The first sensor arrangement 960 comprises pressure sensors. In this way, acoustic pressure may be sensed or detected, enabling control of acoustic signals. Here, the first sensor arrangement 960 comprises a dual-layered 2D array of pressure sensors.

Furthermore, in this example, the system 900 comprises a second sensor arrangement 970. In this way, acoustic pressure may be sensed or detected, enabling control of acoustic signals. Here, the second sensor arrangement 970 comprises a dual-layered 2D array of pressure sensors.

Whilst in this example, the system 900 comprises a first sensor arrangement 960 upstream of the active control unit 950 and a second sensor arrangement 970 downstream of the active control unit 950, benefits of the invention may still be realised by providing only a first sensor arrangement 960. In particular, this may still facilitate control of a transmitted component.

In order to control the transmitted and reflected components, the components are separated from the total acoustic pressure using a wave separation method. To separate the positive and negative propagating waves in 3D, a two-dimensional spatial Fourier transform (SFT) may be used to decompose the spherical incident wave into its directional plane wave components. The two-dimensional SFT can be defined as $$P(k_x, k_y, z) = \int\int_{-\infty}^{\infty} p(x, y, z)e^{j(k_x x+k_y y+k_z z)}dx\,dy$$

where $$k_x = k_0 \cos\varphi \sin\theta,$$

$$k_y = k_0 \sin\varphi \sin\theta,$$

$$k_z = k_0 \cos\theta,$$

$k_x$, $k_y$ and $k_z$ are the spatial frequencies in the x, y and z directions, θ and φ are the spherical angles and $k_0$ is the acoustic wavenumber. To simplify implementation of the two-dimensional SFT, a two-dimensional discrete SFT may be used, which sums the weighted pressures measured at several sampling points, where the weighted pressure at the i-th pressure sensor in each pressure sensor array can be expressed as $$P(k_x, k_y, z_i) = p(x_i, y_i, z_i)W(x_i, y_i)$$

where $$W(x_i, y_i) = e^{j(k_x x_i+k_y y_i+k_z z_i)}$$

$W(x_i, y_i)$ is the complex weighting factor that applies the appropriate phase shift required from the pressure sensor location to the plane perpendicular to incident wave direction.

The weighted pressures can then be used to calculate the positive and negative propagating wave components between the two closely-spaced pressure sensor arrays in the upstream and downstream spaces via the integration wave separation method. The wave components at the i-th pressure sensor can be calculated as $$A_i = \frac{p_{1_i}W(x_i, y_i) + p_{2_i}W(x_i, y_i)}{4} + \frac{c_0}{2}\int_0^{T_s} p_{1_i}W(x_i, y_i) - p_{2_i}W(x_i, y_i)\,dt,$$

$$B_i = \frac{p_{1_i}W(x_i, y_i) + p_{2_i}W(x_i, y_i)}{4} - \frac{c_0}{2}\int_0^{T_s} p_{1_i}W(x_i, y_i) - p_{2_i}W(x_i, y_i)\,dt,$$

$$C_i = \frac{p_{3_i}W(x_i, y_i) + p_{4_i}W(x_i, y_i)}{4} + \frac{c_0}{2}\int_0^{T_s} p_{3_i}W(x_i, y_i) - p_{4_i}W(x_i, y_i)\,dt,$$

$$D_i = \frac{p_{3_i}W(x_i, y_i) + p_{4_i}W(x_i, y_i)}{4} - \frac{c_0}{2}\int_0^{T_s} p_{3_i}W(x_i, y_i) - p_{4_i}W(x_i, y_i)dt,$$

where $c_0$ is the speed of sound in air, $T_s$ is the sampling period, $p_{1_i}$ to $p_{4_i}$ are the pressures measured at the i-th pressure sensor in the first to fourth pressure line arrays.

Once the wave components A, B, C, D have been separated using the pressure measured at each pressure sensor, a feedforward FxLMS algorithm may be used to adaptively control the transmitted wave component C and reflected wave component B, where the reference signal for the calculation is the positive propagating incident wave A.

As introduced above, the system 900 comprises a first control source arrangement 952. Notably, the first control source arrangement 952 comprises a finite 2D array of first control sources for generating a first control signal for controlling a first component of the acoustic signal. Advantageously, by this construction, non-reciprocal acoustic control is realised in a two-dimensional or three-dimensional environment. Furthermore, such a system is fully adaptable, and the direction of the non-reciprocal behaviour can be reversed by changing the reference and error signal for this controller. Importantly, the present system does not introduce distortions or non-linearities into the signal, which avoids problems associated with distortions or non-linearities. Furthermore, broadband non-reciprocal control is realised.

As above, the active control unit 950 may be retrofitted in a system or apparatus comprising the first sensor arrangement 960 and first control source arrangement 952.

The active control unit 950 is configured to receive information from the first sensor arrangement 960. The information provided by the first sensor arrangement 960 relates to the acoustic signal propagating along the propagation path. The active control unit 950 is further configured to generate a control signal for controlling the acoustic signal based on the information from the first sensor arrangement 960.

The active control unit 950 is arranged to control the first control source arrangement 952 to generate a first control signal for controlling a first component of the acoustic signal. The first component is a transmitted component of the acoustic signal. In this way, a single layer of first control sources is advantageous in achieving non-reciprocal acoustic transmission.

The first control signal is used to control the first component of the acoustic signal thereby to minimise the first component of the acoustic signal. In this way, a single layer of first control sources is advantageous in achieving perfect non-reciprocal acoustic transmission.

The first control source arrangement 952 comprises a 2D array of monopole control sources. Advantageously, by this construction, non-reciprocal acoustic control is realised in a two-dimensional or three-dimensional environment.

As mentioned above, the system 900 may further comprise a second control source arrangement 954. The second control source arrangement 954 is operable to generate a second control signal to control a second component of the acoustic signal 910. In this example the second control signal is an acoustic control signal/wave.

Notably, the second control source arrangement 954 comprises a finite 2D array of second control sources for generating a second control signal for controlling a second component of the acoustic signal. Advantageously, by this construction, non-reciprocal acoustic control is realised in a two-dimensional or three-dimensional environment. Furthermore, such a system is fully adaptable, and the direction of the non-reciprocal behaviour can be reversed by changing the reference and error signals for this controller. Importantly, the present system does not introduce distortions or non-linearities into the signal, which avoids problems associated with distortions or non-linearities. Furthermore, broadband non-reciprocal control is realised.

The active control unit 950 is configured to receive information from the second sensor arrangement 970. The information provided by the second sensor arrangement 970 relates to the acoustic signal propagating along the propagation path. The active control unit 950 is further configured to generate a control signal for controlling the acoustic signal based on the information from the second sensor arrangement 970.

The active control unit 950 is arranged to control the second control source arrangement 954 to generate a second control signal for controlling a second component of the acoustic signal. The second component is a reflected component of the acoustic signal. In this way, a single layer of first control sources and dual-layer consisting of second control sources are advantageous in achieving non-reciprocal acoustic transmission and absorption.

The second control signal is used to control the second component of the acoustic signal thereby to minimise the second component of the acoustic signal. In this way, a single layer of first control sources and dual-layer consisting of second control sources are advantageous in achieving perfect non-reciprocal acoustic transmission and absorption.

The second control source arrangement 954 comprises a 2D array of monopole control sources. Advantageously, by this construction, non-reciprocal acoustic control is realised in a two-dimensional or three-dimensional environment.

The first control source arrangement 952 and second control source arrangement 954 comprise loudspeakers. In this way, acoustic signals propagating along the propagation path may be controlled by the provision of acoustic signals by the first control source arrangement 952 and second control source arrangement 954. Here, the first control source arrangement 952 and second control source arrangement 954 each comprise a 2D array of control sources. In this example, the first control source arrangement 952 and second control source arrangement 954 each comprise a finite 2D array of monopole control sources. The first control source arrangement 952 and second control source arrangement 952 are correspondingly arranged to provide pairs of control sources comprising one control source from the first control source arrangement and one control source from the second control source arrangement.

As above, the active control unit 950 is arranged to control the first control source arrangement 952 and second control source arrangement 954. In an example, the active control unit 950 is arranged to independently control the first control source arrangement 952 and second control source arrangement 954. This may be referred to as "decentralised" control. The active control unit 950 is arranged to adaptively calculate the optimal voltage for controlling the first control source arrangement 952 and second control source arrangement 954 to maximise sound absorption.

By independently controlling the first control source arrangement 952 and second control source arrangement 954, a computational load advantage is realised. This is because it is only necessary to determine sets of filter coefficients for two filters for use in generating the control signals, one for each of the control source arrangements 952, 954.

The active control unit 950 can comprise a first controller **950*a* arranged to control the first control source arrangement 952 and a second controller 950*b* arranged to control the second control source arrangement 954. Advantageously, by providing separate controllers, computational complexity may be reduced as each controller is provided for a single operation or purpose. This may facilitate independent control (e.g., decentralised control). In FIG. 9, the wave separation algorithm used by the controllers 950*a*, 950*b*, or by active control unit 950 generally, is indicated generally at 924**.

Figure 10:
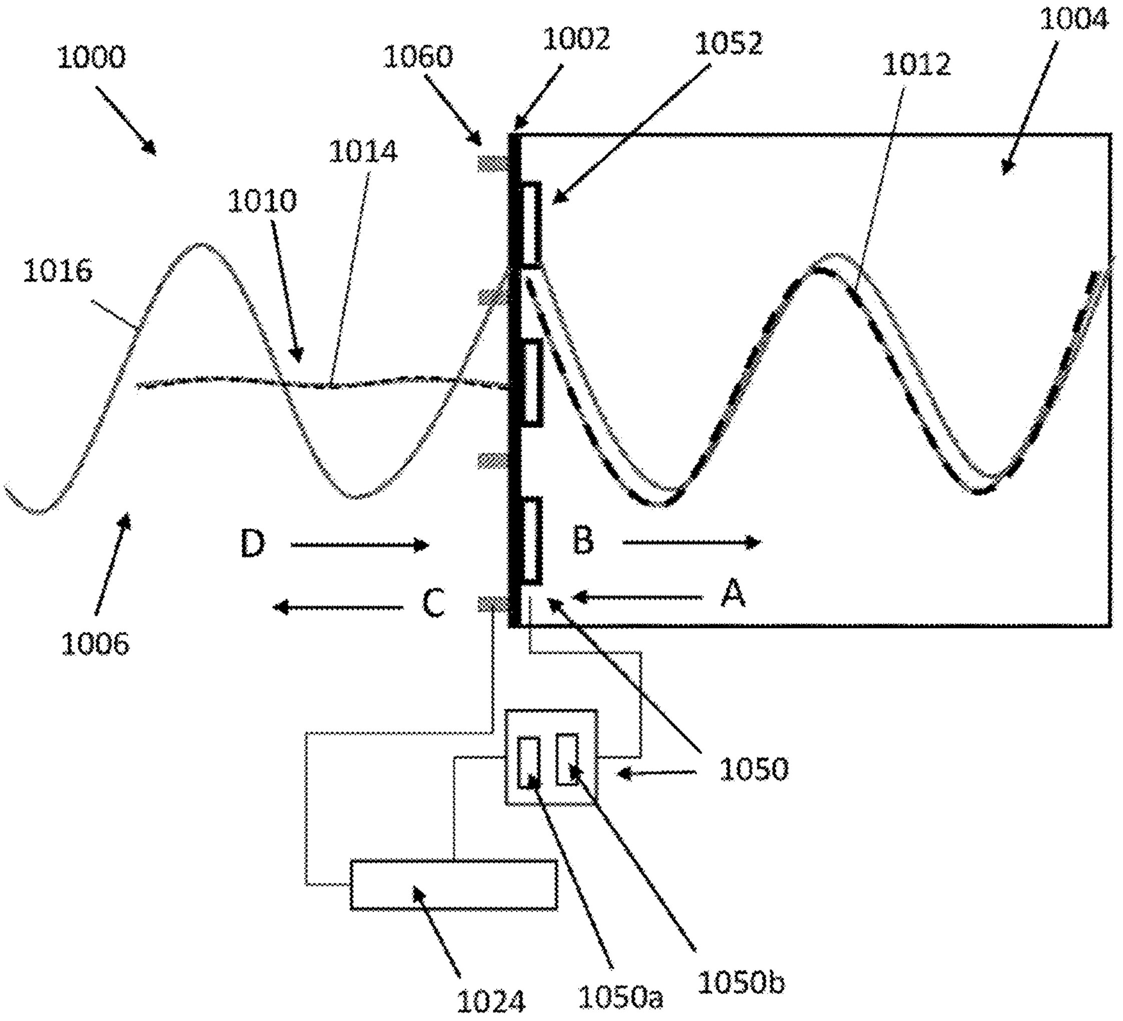
FIG. 10 shows an active acoustic control system according to a sixth embodiment.

Referring to FIG. 10, an active acoustic control system 1000 according to a sixth embodiment is shown.

The active acoustic control system 1000 is for controlling an acoustic signal propagating along a propagation path. The active acoustic control system 1000 is for controlling a first acoustic signal propagating along a propagation path. In particular, the system 1000 is for actively absorbing the first acoustic signal to achieve non-reciprocal acoustic behaviour. In FIG. 10, the first acoustic signal propagating along the propagation path is indicated at 1010. The first acoustic signal 1010 is an acoustic signal propagating and incident on a structural component 1002, thereby to cause the structural component to vibrate or deform. The first acoustic signal 1010 comprises an uncontrolled portion 1012 and a controlled portion 1014. As shown in the figure, the controlled portion 1014 has a reduced amplitude compared with the uncontrolled portion 1012. This is by virtue of the active acoustic control system 1000 being operated to absorb the acoustic signal.

Additionally, a second acoustic signal is indicated at 1016. The second acoustic signal 1016 is an acoustic signal propagating and incident on the structural component 1002, but is not controlled so as to reduce its amplitude. In practice, the second acoustic signal 1016 may be an external (e.g., remote from the system) acoustic signal which it is desired to detect, for example an incoming acoustic signal. The first acoustic signal 1010 may be an internal acoustic signal, that is, a signal generated in the proximity of the system 1000, or at a vehicle in which the system 1000 is employed. In practice, the system 1000 is operable to receive and detect the second acoustic signal 1016, whilst preventing or inhibiting the first acoustic signal 1010 from propagating (e.g., being emitted) to the outside.

The active acoustic control system 1000 according to the sixth embodiment comprises substantially the same components as the active acoustic control systems according the above-described embodiments. Furthermore, the active acoustic control system 1000 according to the sixth embodiment is configured to operate in substantially the same way as the active acoustic control system according to the above-described embodiments, specifically the system 900 according to the fifth embodiment, to exhibit non-reciprocal acoustic control behaviour. That is, the interior is indicated at 1004 and the exterior is indicated at 1006, and the interior sound field is absorbed by the nonreciprocal device, whereas the exterior sound field is perfectly transmitted and can be detected.

The active acoustic control system 1000 is a non-reciprocal active acoustic control system. The system 1000 comprises an active control unit 1050, a first sensor arrangement 1060 and a first control source arrangement 1052. The first control source arrangement 1052 is operable to generate a first control signal to control a first component of the first acoustic signal 1010. In this example the first control signal is an acoustic control signal/wave.

The first sensor arrangement 1060 comprises accelerometers. The accelerometers can sense, or detect, deformation of the structural component 1002 to which they are attached, connected or arranged to sense. In this way, acoustic pressure generated by the acoustic signal may be indirectly sensed, by reference to the deformation of the structural component 1002. Here, the first sensor arrangement 1060 comprises a 2D array of accelerometers.

Whilst not illustrated in FIG. 10, the system 1000 may comprise a second sensor arrangement. In this way, acoustic pressure may be sensed or detected, enabling control of acoustic signals. Here, the second sensor arrangement comprises a 2D array of accelerometers.

Nevertheless, benefits of the invention may still be realised by providing only a first sensor arrangement 1060. In particular, this may still facilitate control of a transmitted component.

As explained above in relation to the system 900 of the fifth embodiment, a two-dimensional SFT may be used to decompose the signal components. Again, once the wave components A, B, C, D have been separated using the structural acceleration measured at each accelerometer, a feedforward FxLMS algorithm may be used to adaptively control the transmitted wave component C and reflected wave component B, where the reference signal for the calculation is the positive propagating incident wave A.

The system 1000 comprises a first control source arrangement 1052. Notably, the first control source arrangement 1052 comprises a finite 2D array of first control sources for generating a first control signal for controlling a first component of the acoustic signal. Advantageously, by this construction, non-reciprocal acoustic control is realised in a two-dimensional or three-dimensional environment. Furthermore, such a system is fully adaptable, and the direction of the non-reciprocal behaviour ca be reversed. Importantly, the present system does not introduce distortions or non-linearities into the signal, which avoids problems associated with distortions or non-linearities. Furthermore, broadband non-reciprocal control is realised.

As above, the active control unit 1050 may be retrofitted in a system or apparatus comprising the first sensor arrangement 1060 and first control source arrangement 1052.

The active control unit 1050 is configured to receive information from the first sensor arrangement 1060. The information provided by the first sensor arrangement 1060 relates to the acoustic signal propagating along the propagation path. The active control unit 1050 is further configured to generate a control signal for controlling the acoustic signal based on the information from the first sensor arrangement 1060.

The active control unit 1050 is arranged to control the first control source arrangement 1052 to generate a first control signal for controlling a first component of the acoustic signal 1010. The first component is a transmitted component C of the acoustic signal 1010. In this way, a single layer of first control sources is advantageous in achieving non-reciprocal acoustic transmission.

The first control signal is used to control the first component of the acoustic signal 1010 thereby to minimise the first component of the acoustic signal. In this way, a single layer of first control sources is advantageous in achieving perfect non-reciprocal acoustic transmission.

The first control source arrangement 1052 comprises a 2D array of control sources. Advantageously, by this construction, non-reciprocal acoustic control is realised in a two-dimensional or three-dimensional environment.

The first control source arrangement 1052 comprises actuators. In this way, acoustic signals propagating along the propagation path may be controlled by the provision of vibrational input control signals by the first control source arrangement 1052.

The first sensor arrangement 1060 comprises accelerometers. The accelerometers can sense, or detect, deformation of the structural member 1002 to which they are attached, connected or arranged to sense. In this way, acoustic pressure generated by the acoustic signal may be indirectly sensed, by reference to the deformation of the structural member. The signals from the accelerometers estimate the particle velocity and pressure at far field, and these are used to separate the positive and negative wave component in the upstream and downstream sections.

Where the system 1000 comprises a first control source arrangement 1052 and a second control source arrangement (not shown), the active control unit 1050 is arranged to independently control the first control source arrangement 1052 and second control source arrangement. This may be referred to as "decentralised" control. The active control unit 1050 is arranged to adaptively calculate the optimal voltage for controlling the first control source arrangement 1052 and second control source arrangement to maximise sound absorption, to achieve perfect non-reciprocal acoustic control.

By independently controlling the first control source arrangement 1052 and second control source arrangement, a computational load advantage is realised. This is because it is only necessary to determine sets of filter coefficients for two filters for use in generating the control signals, one for each of the control source arrangements.

The active control unit 1050 can comprise a first controller **1050*a* arranged to control the first control source arrangement 1052 and a second controller 1050*b* arranged to control the second control source arrangement. Advantageously, by providing separate controllers, computational complexity may be reduced as each controller is provided for a single operation or purpose. In FIG. 10, the wave separation algorithm used by the controllers 1050*a*, 1050*b*, or by active control unit 1050 generally, is indicated generally at 1024**.

In summary, embodiments of active acoustic control systems are herein described. It is an aim of embodiments described herein to provide an active acoustic control system to control acoustic absorption in an environment. It is also an aim of embodiments described herein to provide an active acoustic control system to exhibit non-reciprocal behaviour in an environment. As will be understood by the skilled person that components or functionality of one embodiment may be combined, or replace, components or functionality of any other embodiment.

Figure 11:
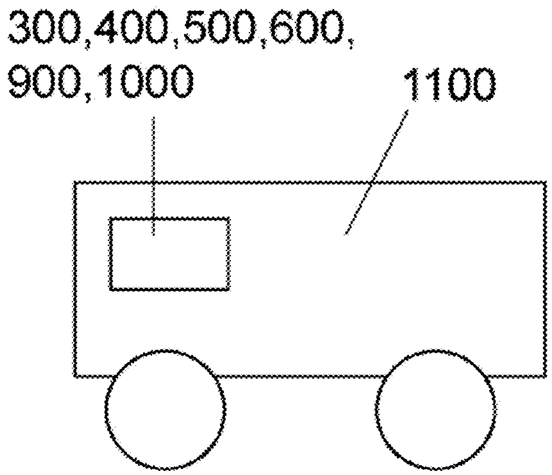
FIG. 11 shows a vehicle comprising an active acoustic control system.

Referring to FIG. 11, a vehicle 1100, for example a land-based vehicle or a sub-surface vehicle, is shown. The vehicle 1100 comprises an active acoustic control system 300, 400, 500, 600, 900, 1000 according to any one of the embodiments described above.

Figure 12:
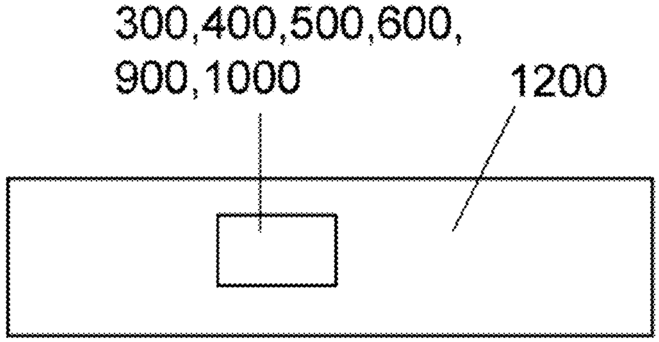
FIG. 12 shows a vehicle component comprising an active acoustic control system.

Referring to FIG. 12, a vehicle component 1200, for example a panel of a vehicle, is shown. The vehicle component 1200 comprises an active acoustic control system 300, 400, 500, 600, 900, 1000 according to any one of the embodiments described above.

Figure 13:
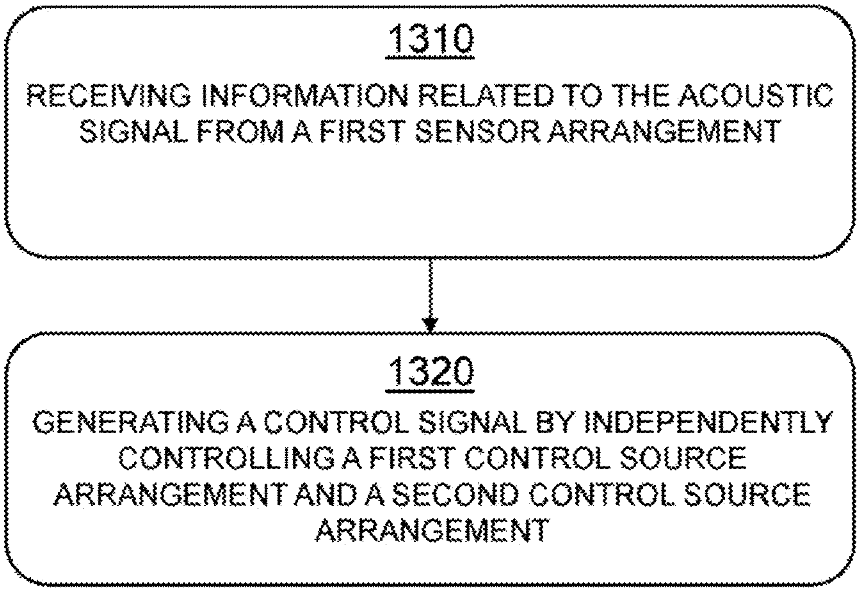
FIG. 13 shows general methodology principles.

Referring to FIG. 13, a method of controlling an acoustic signal propagating along a propagation path is shown. Step 1310 comprises receiving information related to the acoustic signal propagating along the propagation path from a first sensor arrangement. Step 1320 comprises generating a control signal for controlling the acoustic signal based on the received information by independently controlling: a first control source arrangement for generating a first control signal for controlling a first component of the acoustic signal; and a second control source arrangement for generating a second control signal for controlling a second component of the acoustic signal.

Figure 14:
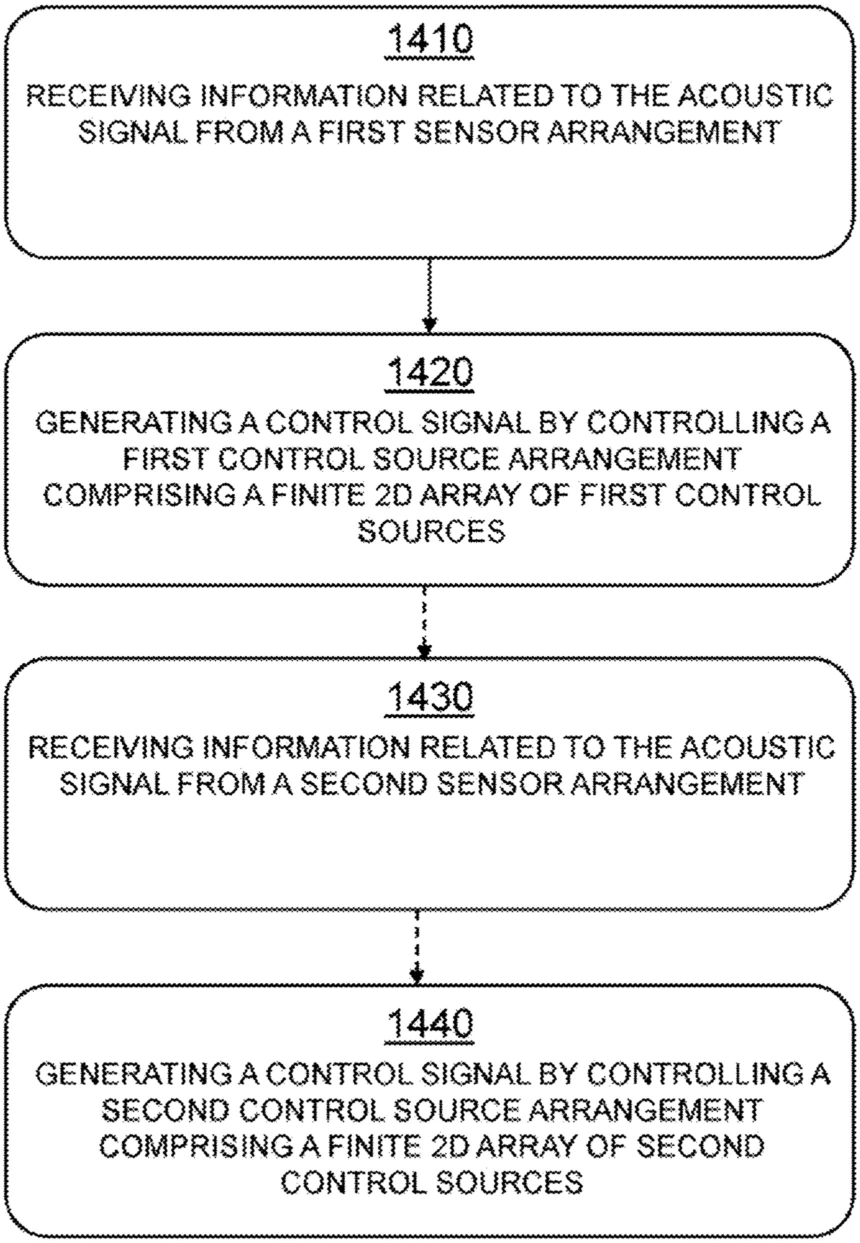
FIG. 14 shows general methodology principles.

Referring to FIG. 14, a method of controlling an acoustic signal propagating along a propagation path is shown. Step 1410 comprises receiving information related to the acoustic signal propagating along the propagation path from a first sensor arrangement. Step 1420 comprises generating a control signal for controlling the acoustic signal based on the received information by controlling: a first control source arrangement comprising a finite 2D array of first control sources for generating a first control signal for controlling a first component of the acoustic signal.

Optional step 1430 comprises receiving information related to the acoustic signal propagating along the propagation path from a second sensor arrangement. Optional step 1440 comprises generating a control signal for controlling the acoustic signal based on the received information by controlling: a second control source arrangement comprising a finite 2D array of second control sources for generating a second control signal for controlling a second component of the acoustic signal.

Although a few preferred embodiments of the present invention have been shown and described, it will be appreciated by those skilled in the art that various changes and modifications might be made without departing from the scope of the invention, as defined in the appended claims.

The preceding description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An active acoustic control system for controlling an acoustic signal propagating along a propagation path, the system comprising an active control unit configured to:

receive first information from a first sensor arrangement, the first information related to the acoustic signal propagating along the propagation path;

receive second information from a second sensor arrangement, the second information related to the acoustic signal propagating along the propagation path;

separate transmitted and reflected components from a total acoustic pressure of the acoustic signal propagating along the propagation path using the first information, the second information, and a wave separation algorithm;

control, based on the first information, a first control source arrangement comprising a finite two-dimensional (2D) array of first control sources configured to control the transmitted component of the acoustic signal; and control, based on the second information, a second control source arrangement comprising a finite 2D array of second control sources configured to control the reflected component of the acoustic signal, wherein the active control unit is configured to independently control the first control source arrangement and the second control source arrangement.

2. The active acoustic control system according to claim 1, wherein the transmitted component is a transmitted component of the acoustic signal.

3. The active acoustic control system according to claim 2, wherein the reflected component is a reflected component of the acoustic signal.

4. The active acoustic control system according to claim 3, wherein the first control sources are configured to minimize the transmitted component of the acoustic signal, and the second control sources are configured to minimize the reflected component of the acoustic signal.

5. The active acoustic control system according to claim 1, wherein the first control source arrangement and/or the second control source arrangement comprises a 2D array of first monopole control sources.

6. The active acoustic control system according to claim 1, wherein the first control source arrangement and the second control source arrangement are correspondingly arranged to provide pairs of control sources comprising one of the first control sources from the first control source arrangement and one control source from the second control source arrangement.

7. The active acoustic control system according to claim 1, wherein the active control unit comprises:

a first controller arranged to control the first control source arrangement; and a second controller arranged to control the second control source arrangement.

8. The active acoustic control system according to claim 1, wherein the first control source arrangement and second control source arrangement comprise one or more loudspeakers and/or one or more actuators.

9. The active acoustic control system according to claim 1, wherein the first sensor arrangement and second sensor arrangement comprise one or more pressure sensors and/or one or more accelerometers.

10. The active acoustic control system according to claim 1, comprising an acoustic guide defining the propagation path.

11. A vehicle and/or a vehicle component, comprising the active acoustic control system according to claim 1.

12. A method of controlling an acoustic signal propagating along a propagation path, the method comprising:

receiving first information related to the acoustic signal propagating along the propagation path from a first sensor arrangement;

receiving second information related to the acoustic signal propagating along the propagation path from a second sensor arrangement;

separating transmitted and reflected components from a total acoustic pressure of the acoustic signal propagating along the propagation path using the first information, the second information, and a wave separation algorithm;

controlling, based on the first information, a first control source arrangement comprising a finite two-dimensional (2D) array of first control sources configured to control the transmitted component of the acoustic signal; and controlling, based on the second information, a second control source arrangement comprising a finite 2D array of second control sources configured to control the reflected component of the acoustic signal, wherein the active control unit is configured to independently control the first control source arrangement and the second control source arrangement.

13. The method according to claim 12, wherein the first control source arrangement and the second control source arrangement comprise one or more loudspeakers and/or one or more actuators.

14. The method according to claim 12, wherein the first sensor arrangement and the second senor arrangement comprise one or more pressure sensors and/or one or more accelerometers.

* * * * *